United States Patent

[11] 3,610,267

| [72] | Inventor | Carl H. Warren<br>New Hope, Ala. |
|---|---|---|
| [21] | Appl. No. | 883,081 |
| [22] | Filed | Dec. 8, 1969 |
| [45] | Patented | Oct. 5, 1971 |
| [73] | Assignee | The United States of America as represented by the Secretary of the Army |

[54] FLUIDIC ACTUATED FLAPPER DRIVEN JET PIPE SERVO VALVE FOR ATTITUDE CONTROL SYSTEMS
2 Claims, 4 Drawing Figs.

| [52] | U.S. Cl. | 137/81.5 |
|---|---|---|
| [51] | Int. Cl. | F15c 3/12 |
| [50] | Field of Search | 137/81.5; 74/5.6; 91/3; 239/265.23, 265.35 |

[56] References Cited
UNITED STATES PATENTS

| 3,137,309 | 6/1964 | Blase et al. | 137/81.5 |
|---|---|---|---|
| 3,276,463 | 10/1966 | Bowles | 137/81.5 |
| 3,311,987 | 4/1967 | Blazek | 74/5.6 |
| 3,354,908 | 11/1967 | Levesque | 137/81.5 X |
| 3,435,688 | 4/1969 | Ogren | 74/5.6 |
| 3,465,600 | 9/1969 | Riordan et al. | 74/5.6 |
| 3,492,879 | 2/1970 | Riordan et al. | 74/5.6 |
| 3,509,773 | 5/1970 | Arnett | 137/81.5 X |
| 3,533,427 | 10/1970 | Chapin | 137/81.5 |

*Primary Examiner*—Samuel Scott
*Attorneys*—Harry M. Saragovitz, Edward J. Kelly, Herbert Berl and Harold W. Hilton ABSTRACT: Apparatus for utilizing low-energy gas flow from a fluid amplifier for directing in proportional manner, a high-energy output for driving a mechanism such as a piston-type actuator for moving jet vanes, or the like, for controlling the attitude of a rocket. A differential control flow from a fluid amplifier is impinged on opposite sides of a flapper for displacement thereof to proportionately open and close ports in the apparatus which direct a gas at high pressures to the piston actuated mechanism for controlling the attitude of the rocket.

PATENTED OCT 5 1971

3,610,267

Carl H. Warren,
INVENTOR

FLUIDIC ACTUATED FLAPPER DRIVEN JET PIPE SERVO VALVE FOR ATTITUDE CONTROL SYSTEMS

SUMMARY OF THE INVENTION

An attitude control system utilizing a fluidic actuated, flapper driven servo valve for attitude control of a rocket. A high-pressure gas is directed into a movable nozzle which is mounted in a housing and provided with a pair of ports therein. Each port is disposed on opposite sides of a flapper carried on the nozzle barrel. A fluid amplifier is provided with a pair of proportional outputs disposed in communication with the input or control ports of the servo valve. The fluid amplifier is controlled, in conventional manner, to selectively direct a gas at substantially low pressures to the input ports of the servo valve for impingement against the flapper for providing differential pressures across the flapper for pivoting the nozzle to direct the high-pressure gases through the exit ports provided in the servo valve. The high-pressure gas is then directed to proportionally actuate a piston type actuator for controlling the movement of jet vanes or the like.

It is, therefore, an object of the present invention to provide mechanism for attitude control of a rocket.

It is another object of the present invention to provide such attitude control mechanism in which low-energy gas flow is utilized for proportionally controlling the flow of high-energy gases to an actuating mechanism.

Other objects and advantages of the present invention will be more readily apparent from the following drawing and description.

Figure 1:
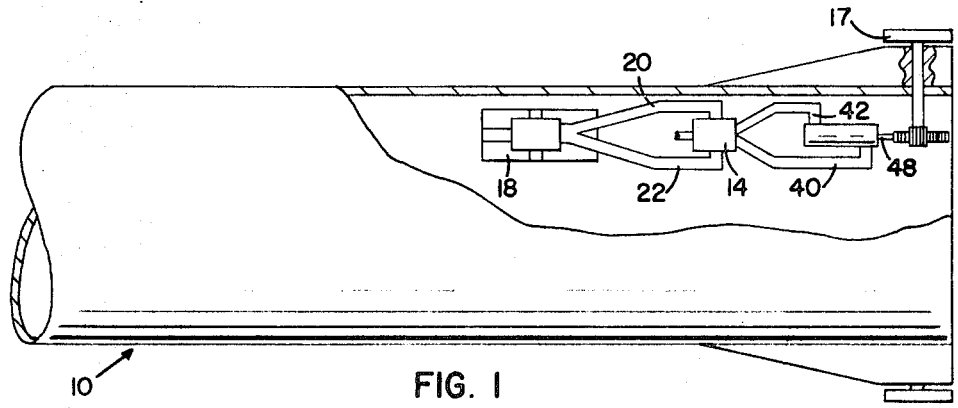
FIG. 1 is a diagrammatic view of the attitude control system of the present invention.
Figure 2:
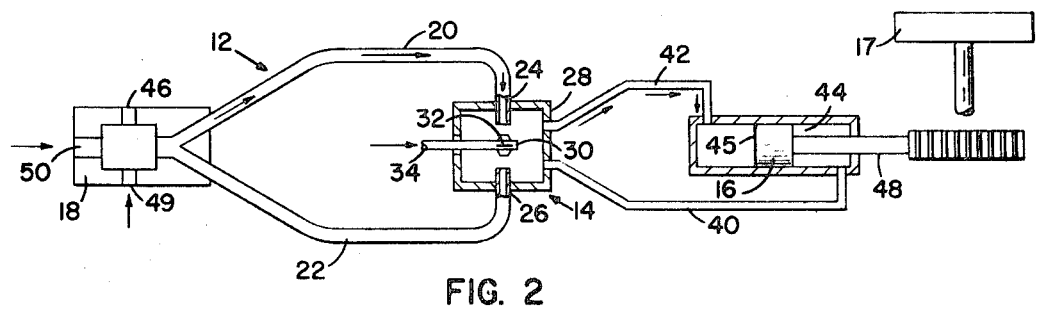
FIG. 2 is a diagrammatical view, partially in section, of the servo valve as used in the attitude control system of FIG. 1.
Figure 4:
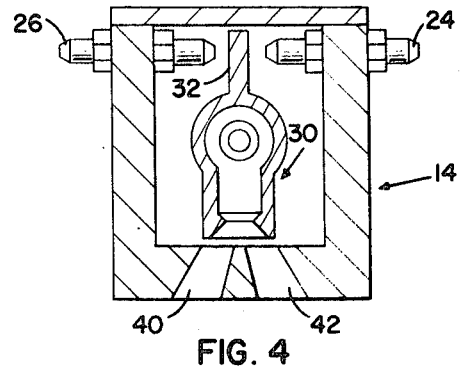
Figure 3:
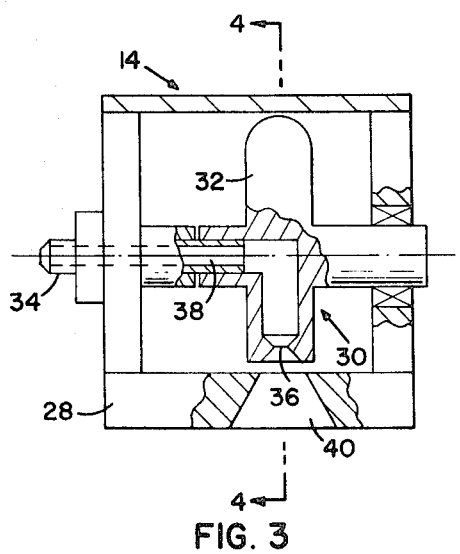
FIG. 3 is a sectional view taken along line 2—2 of FIG. 2.

FIG. 4 is a sectional view taken along line 4—4 of FIG. 3. As shown in FIGS. 1 and 2, a rocket 10 is provided with an attitude control system 12 including a servo valve 14 connected to a piston 16 for displacement thereof for actuation of a jet vane 17 carried about the periphery of rocket 12 for attitude control thereof. A fluid amplifier 18 is provided with a pair of output channels 20 and 22 connected to a pair of input ports 24 and 26, respectively, of servo valve 14 for actuation thereof.

As shown in FIGS. 2 and 3, valve 14 includes a housing 28 having a nozzle 30 rotatably mounted therein. A flapper member 32 is secured to nozzle 30 and extends upwardly therefrom between a pair of input ports 24 and 26 (FIG. 3) of the valve. Nozzle 30 is provided with an inlet 34 connected to a source of high-pressure fluid (not shown) and an outlet 36 disposed in substantially normal relation to inlet 34 and communication therewith by a chamber 38. Housing 28 includes a pair of exit ports 40 and 42 provided in the housing in spaced relation adjacent outlet 36 of the nozzle.

Ports 40 and 42 are disposed in communication with an actuating assembly (FIG. 2) including a cylinder 44 having piston 16 slidably carried therein. A piston rod 48 is secured to the piston and to jet vane 17 for movement thereof to effect control of the rocket responsive to movement thereof.

In operation, control ports 46 and 48 of the fluid amplifier are actuated, in conventional manner, such as by a fluidic gyro, or the like, to direct a power jet from inlet 50 through one of the output channels 20 or 22 of the fluid amplifier into one of the inlet ports 24 and 26 of the servo valve for displacement of flapper 32 to control fluid flow from the servo valve.

For example, if as shown in FIG. 2, control port 49 of the fluid amplifier is provided with an input signal, the fluid therein is directed through output channel 20 and into servo valve input port 24 for impingement against flapper 32 to pivot nozzle 30 for directing a high-pressure fluid therefrom through servo valve exit port 42.

The high-pressure fluid is then directed through channel or conduit 42 to be injected in cylinder 44 against the face 45 of piston 16 to effect displacement thereof. Piston rod 48 transmits this motion to vane 17 for pivotal movement thereof on the body of the rocket for attitude control thereof.

It should be noted that as the differential flow from the fluid amplifier impinges on the flapper the pressure, in the servo valve, between the nozzles and the flapper displaces the flapper to a new equilibrium position for every differential input flow. This new equilibrium position is proportional to the differential input flow. The proportionality of this position to the input naturally assumes no external load on the flapper and a predetermined area change between the nozzle and the flapper which is proportional to flapper movement. As the flapper moves, the exit ports in the valve body are more or less in direct communication with the exit port of the nozzle to provide an output from the servo valve which is proportional to the low-pressure fluid amplifier control input. This output, in turn, effects the rate of piston displacement which, in turn, effects the jet vane movement to provide precise attitude control of the rocket.

To provide precise control over the amount of piston displacement, and thus, the extent of jet vane movement, the control fluidic amplifier would be of the summing type with the additional control ports connected to a pneumatic pickoff which senses the degree of rotation of the vane shaft to provide feedback signals to the control amplifier. Such pneumatic pickoffs and summing amplifiers are known in the art. Or, if desired, other conventional feedback means may be employed; however, such mechanism is encompassed in the inventive concept of the present invention as set forth in the appended claims.

1. A rocket attitude control system for a rocket having movable control surfaces disposed thereon for controlling the attitude of the rocket comprising:

a. servo valve means including a body having a pair of inlet ports on opposite sides thereof, a movable nozzle having a flapper member disposed thereon intermediate said inlet ports, said nozzle means having an inlet disposed in communication with a source of substantially high-pressure fluid and an outlet in communication with said inlet and disposed for ejection of said high-pressure fluid through predetermined exit ports provided in said body of said servo valve.

b. fluidic valve means having a pair of outlets each communicating with said inlet ports of said body, said fluidic valve means disposed for operation for ejecting fluid pressure through a predetermined said inlet for impingement against said flapper member of said nozzle for proportional displacement thereof for directing a predetermined amount of said high-pressure fluid from said nozzle outlet through a desired said exit port in said body;

c. prime mover means disposed for receiving said high-pressure fluid for displacement of said control surfaces to an extent which is proportional to said nozzle displacement.

2. Apparatus as in claim 1 wherein said prime mover means includes a cylinder having a piston slidably mounted therein and connected to said jet vanes.